(12) United States Patent
Anderson et al.

(10) Patent No.: US 7,886,192 B2
(45) Date of Patent: *Feb. 8, 2011

(54) METHOD FOR FAST SYSTEM RECOVERY VIA DEGRADED REBOOT

(75) Inventors: Gary Dean Anderson, Austin, TX (US); Sheldon Ray Bailey, Rochester, MN (US); Wayne Allan Britson, Rochester, MN (US); Alongkorn Kitamorn, Austin, TX (US); Michael Alan Kobler, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 266 days.

This patent is subject to a terminal disclaimer.

(21) Appl. No.: 12/165,058

(22) Filed: Jun. 30, 2008

(65) Prior Publication Data

US 2008/0256388 A1 Oct. 16, 2008

Related U.S. Application Data

(63) Continuation of application No. 10/809,554, filed on Mar. 25, 2004, now Pat. No. 7,415,634.

(51) Int. Cl.
 *G06F 11/00* (2006.01)
(52) U.S. Cl. .................... 714/36; 714/9; 713/2
(58) Field of Classification Search ........................ None
 See application file for complete search history.

(56) References Cited

U.S. PATENT DOCUMENTS

| | | | |
|---|---|---|---|
| 4,939,142 A | 7/1990 | Budai et al. | |
| 5,291,600 A | 3/1994 | Lutz et al. | |
| 5,692,189 A | 11/1997 | Lipe | |
| 5,774,645 A | 6/1998 | Beaujard et al. | |
| 5,815,647 A | 9/1998 | Buckland et al. | |
| 5,951,686 A | 9/1999 | McLaughlin et al. | |
| 5,974,546 A | 10/1999 | Anderson | |
| 6,122,756 A | 9/2000 | Baxter et al. | |
| 6,233,680 B1 | 5/2001 | Bossen et al. | |
| 6,243,823 B1 | 6/2001 | Bossen et al. | |
| 6,251,014 B1 | 6/2001 | Stockdale et al. | |
| 6,496,945 B2 | 12/2002 | Cepulis et al. | |
| 6,651,182 B1 | 11/2003 | Chang et al. | |
| 6,654,903 B1 | 11/2003 | Sullivan, Jr. et al. | |
| 6,865,688 B2 | 3/2005 | Dawkins et al. | |
| 6,898,731 B2 | 5/2005 | Hack et al. | |
| 6,901,537 B2 | 5/2005 | Dawkins et al. | |
| 7,266,727 B2 | 9/2007 | Crowell et al. | |
| 7,337,373 B2 | 2/2008 | O'Brien et al. | |
| 7,430,691 B2 * | 9/2008 | Kulkarni et al. | 714/44 |
| 2002/0087687 A1 | 7/2002 | Zaifman et al. | |
| 2002/0184576 A1 | 12/2002 | Arndt et al. | |
| 2003/0172315 A1 | 9/2003 | Grammel | |
| 2003/0233594 A1 | 12/2003 | Earl | |
| 2004/0064761 A1 * | 4/2004 | Harrington et al. | 714/43 |
| 2004/0148542 A1 | 7/2004 | McAfee et al. | |
| 2004/0210800 A1 | 10/2004 | Ghislain Gabriel Vecoven et al. | |

* cited by examiner

*Primary Examiner*—Gabriel L Chu
(74) *Attorney, Agent, or Firm*—Yee & Associates, P.C.; Matthew W. Baca

(57) ABSTRACT

A system and method for fast system recovery that bypasses diagnostic routines by disconnecting failed hardware from the system before rebooting. Failed hardware and hardware that will be affected by removal of the failed hardware of the system are disconnected from the system. The system is restarted, and because the failed hardware is disconnected, diagnostic routines may safely be eliminated from the reboot process.

11 Claims, 3 Drawing Sheets

METHOD FOR FAST SYSTEM RECOVERY VIA DEGRADED REBOOT

This application is a continuation of U.S. application Ser. No. 10/809,554, filed Mar. 25, 2004 now U.S. Pat. No. 7,415,634, and entitled, "Method for Fast System Recovery Via Degraded Reboot."

BACKGROUND OF THE INVENTION

1. Technical Field

The present invention is generally related to an improved data processing system, and particularly to a method and apparatus for dealing with failed hardware in a data processing system.

2. Description of Related Art

Modern computer systems with high availability requirements use many design methods to recover from hardware errors and resume normal system operation. Some of the errors can be recovered with no effect to the operating system or user applications, and some with small or minimal effect as described in pending U.S. patent application Ser. No. 09/821,061, "Method and Apparatus for Parity Error Recovery." Hardware errors which cannot be recovered without customer data integrity exposure result in system termination. To recover from system termination, a method of automatic system reboot recovery has been described, for example, in U.S. Pat. No. 5,951,686. To prevent hardware with errors from further affecting system operation after reboot, methods have been devised for persistent deconfiguration of the processor and memory in a computer system, such as that taught in U.S. Pat. Nos. 6,223,680, and 6,234,823.

However, the existing persistent deconfiguration methods only handle errors which are internal to the processor or memory subsystems only. The existing methods do not work with hardware errors on the interface bus between subsystems in the computer. Therefore, during automatic system reboot recovery after error, a thorough diagnostic testing of the system hardware is required to ensure that the system can be rebooted successfully. A thorough hardware testing during system recovery lengthens recovery time, thus reducing system availability. Also, some of the hardware errors in the computer system are intermittent in nature, therefore a brief diagnostic testing during automatic system recovery may not always detect these errors. The same error may reappear again and cause another system outage.

Therefore, it would be beneficial to have a way to identify all hardware errors after system termination and fence off those errors from the system configuration.

SUMMARY OF THE INVENTION

The present invention discloses a system where hardware functional units that experience errors are disconnected from the system, for example, by activating switches of the hardware circuitry. Hardware functional units that are associated with or connected to the error hardware or that would be adversely affected by removal of the hardware with error are also removed from the system. The removed units are noted in a table. With the hardware errors fenced off, the computer then performs an automatic fast system reboot recovery, bypassing a thorough diagnostic testing of the system hardware and thereby reducing downtime for the system.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
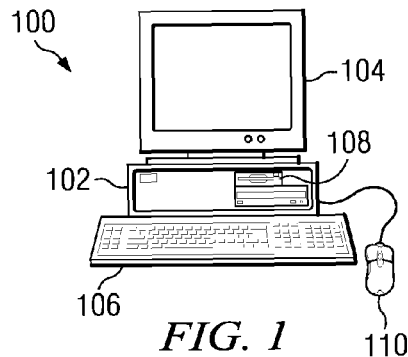
FIG. 1 shows a computer system consistent with a preferred embodiment of the present invention.

With reference now to the figures and in particular with reference to FIG. 1, a pictorial representation of a data processing system in which the present invention may be implemented is depicted in accordance with a preferred embodiment of the present invention. A computer 100 is depicted which includes a system unit 102, a video display terminal 104, a keyboard 106, storage devices 108, which may include floppy drives and other types of permanent and removable storage media, and mouse 110. Additional input devices may be included with personal computer 100, such as, for example, a joystick, touchpad, touch screen, trackball, microphone, and the like. Computer 100 can be implemented using any suitable computer, such as an IBM eServer computer or IntelliStation computer, which are products of International Business Machines Corporation, located in Armonk, N.Y. Although the depicted representation shows a computer, other embodiments of the present invention may be implemented in other types of data processing systems, such as a network computer. Computer 100 also preferably includes a graphical user interface that may be implemented by means of systems software residing in computer readable media in operation within computer 100.

Figure 2:
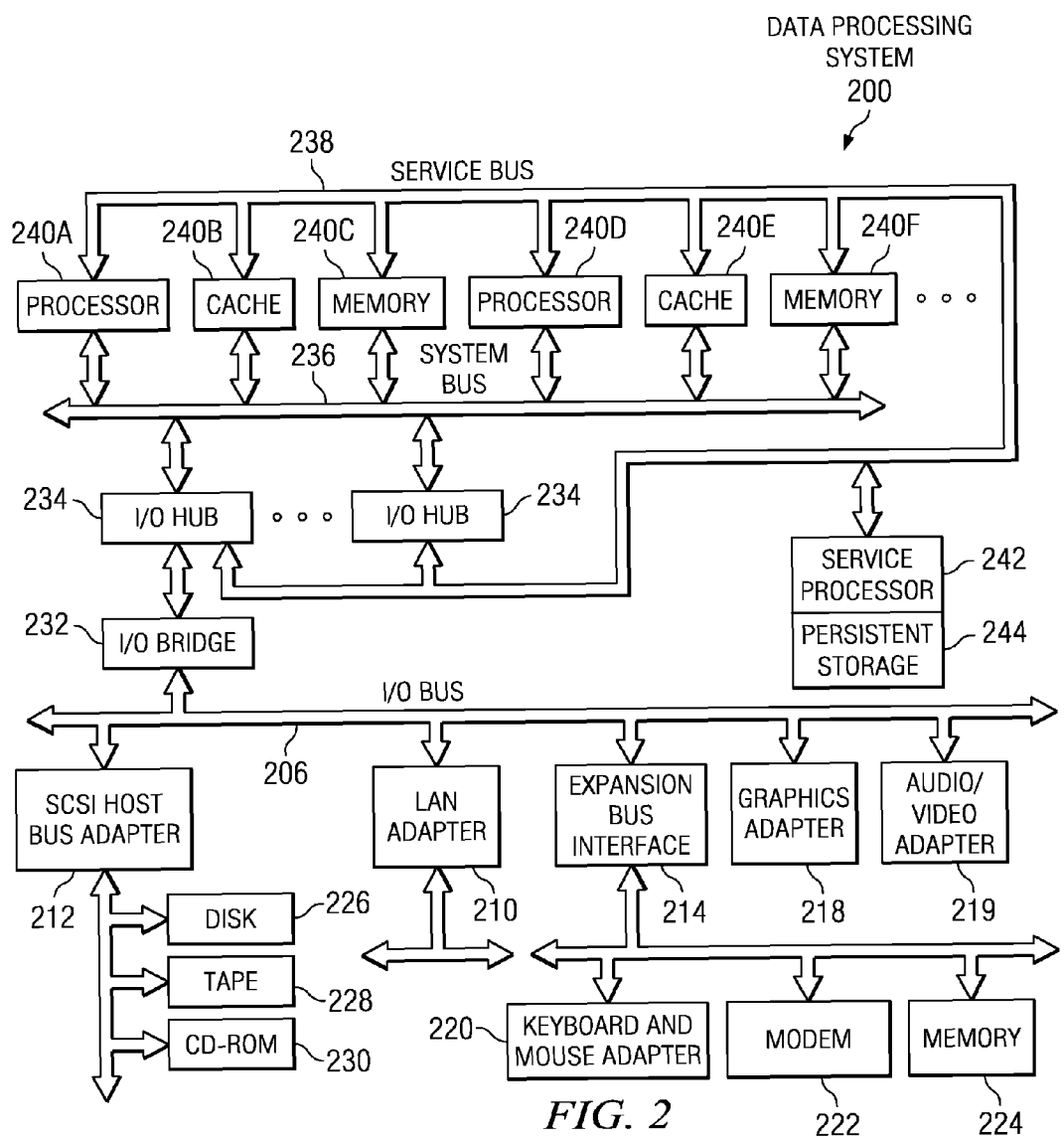
FIG. 2 shows a block diagram of a computer system consistent with a preferred embodiment of the present invention.

With reference now to FIG. 2, a block diagram of a data processing system is shown in which the present invention may be implemented. Data processing system 200 is an example of a computer, such as computer 100 in FIG. 1, in which code or instructions implementing the processes of the present invention may be located. Data processing system 200 employs a peripheral component interconnect (PCI) local bus architecture. Although the depicted example employs a PCI bus, other bus architectures such as Accelerated Graphics Port (AGP) and Industry Standard Architecture (ISA) may be used. Processor 240A/240D, cache 240B/240E, and main memory 240C/240F are connected to system bus 236 and to PCI I/O bus 206 through I/O hub 234 and PCI I/O bridge 232. Additional connections to PCI local bus 206 may be made through direct component interconnection or through add-in boards. In the depicted example, local area network (LAN) adapter 210, small computer system interface SCSI host bus adapter 212, and expansion bus interface 214 are connected to PCI local bus 206 by direct component connection. In contrast, graphics adapter 218, and audio/video adapter 219 are connected to PCI local bus 206 by add-in boards inserted into expansion slots. Expansion bus interface 214 provides a connection for a keyboard and mouse adapter 220, modem 222, and additional memory 224. SCSI host bus adapter 212 provides a connection for hard disk drive 226, tape drive 228, and CD-ROM drive 230. Typical PCI local bus implementations will support three or four PCI expansion slots or add-in connectors.

FIG. 2 also depicts I/O subsystems. I/O subsystem includes PCI I/O bridge 232, and I/O hubs 234. Hubs 234 connect to system bus 236 and service bus 238. System bus 236 and service bus 238 connect to other elements 240A-F of the data processing system, such as processor 240A, cache 240B, memory 240C, processor 240D, cache 240E, and memory 240F. Service bus 238 also connects to service processor 242 and persistent storage 244.

An operating system runs on processor 240A/240D and is used to coordinate and provide control of various components within data processing system 200 in FIG. 2. The operating system may be a commercially available operating system such as Windows 2000, which is available from Microsoft Corporation. An object oriented programming system such as Java may run in conjunction with the operating system and provides calls to the operating system from Java programs or applications executing on data processing system 200. "Java" is a trademark of Sun Microsystems, Inc. Instructions for the operating system, the object-oriented programming system, and applications or programs are located on storage devices, such as hard disk drive 226, and may be loaded into main memory 240C/240F for execution by processor 240A/240D.

Those of ordinary skill in the art will appreciate that the hardware in FIG. 2 may vary depending on the implementation. Other internal hardware or peripheral devices, such as flash ROM (or equivalent nonvolatile memory) or optical disk drives and the like, may be used in addition to or in place of the hardware depicted in FIG. 2. Also, the processes of the present invention may be applied to a multiprocessor data processing system.

For example, data processing system 200, if optionally configured as a network computer, may not include SCSI host bus adapter 212, hard disk drive 226, tape drive 228, and CD-ROM 230. In that case, the computer, to be properly called a client computer, must include some type of network communication interface, such as LAN adapter 210, modem 222, or the like. As another example, data processing system 200 may be a stand-alone system configured to be bootable without relying on some type of network communication interface, whether or not data processing system 200 comprises some type of network communication interface. As a further example, data processing system 200 may be a personal digital assistant (PDA), which is configured with ROM and/or flash ROM to provide non-volatile memory for storing operating system files and/or user-generated data.

The depicted example in FIG. 2 and above-described examples are not meant to imply architectural limitations. For example, data processing system 200 also may be a notebook computer or hand held computer in addition to taking the form of a PDA. Data processing system 200 also may be a kiosk or a Web appliance.

The processes of the present invention are performed by the service processor 242 using computer implemented instructions, which may be located in the service processor memory.

In a preferred embodiment, the present invention describes a method to identify the hardware functional units having a bus interface error, and deconfigures the bus interface hardware functional unit(s) with errors, referring to an "error" reason preferably stored in persistent storage 244. In preferred embodiments, the present innovative system then identifies associated hardware functional units that are affected by the bus interface units that were deconfigured, and deconfigures the affected units using a unique, "association" reason. All functional units that were deconfigured to a common bus interface error are linked together, or associated with one another in a table stored in the service processor persistent storage 244. When the hardware with errors is replaced (e.g., as detected by the change in the part serial number), the functional units that were deconfigured with an "error" and "association" reason are cleared and resume operation.

The present invention also adds to existing deconfiguration functions with the capability to persistently deconfigure I/O hub adapter. These enhancements allow deconfiguration of the majority of the hardware errors in the CEC during IPL. The enhancement reduces system outages by minimizing or eliminating platform failure rediscovery. After system termination and successful deconfiguration of hardware with errors, the system can be rebooted quickly, bypassing diagnostic testing, thus improving system availability. Preferred embodiments allow users to set the policy for deconfiguring hardware from the system under error conditions.

The present invention is described with reference to various functions. Specific implementations of these functions are described below. It is noted that the example implementations given are not intended to limit the scope of the invention, but only to serve as an exemplary embodiment. The following description refers to the "CEC", or Central Electronic Complex of the computer system, which includes the core microprocessors, cache, memory subsystem, and I/O hub which connects the CEC to the I/O adapters. Other peripherals are considered outside the CEC.

The "Deconfiguration function" is designed to enhance system availability by removing "faulty" CEC hardware from the system configuration. The deconfiguration action can occur either during system run-time (dynamically) or boot-time (IPL) depend on the fault type and when the fault is detected. Some hardware fault in the system can be discovered during system boot or IPL time via diagnostics and some fault can be detected, corrected or recovered during runtime. The run time correctable/recoverable error can be monitored for trend toward uncorrectable. By deconfiguring these "faulty" hardware from the system, a potential system outage can be prevented, thus enhance system availability. In addition, run-time unrecoverable hardware fault can be deconfigured from the system after the first occurrence. The system can be rebooted immediately after failure and resume operation with only good hardware. Therefore this prevents the same "faulty" hardware from impacting the system operation again while the repair action can be deferred to a more convenient and less critical time for the customer operation. This function contains the persistent state of the hardware functional unit within the CEC, the User Policy and deconfiguration rules based on the policies. The hardware functional units are defined in the smallest possible unit to optimize the hardware configuration capability. The functional unit contains the configuration state and the error type. During system IPL, this function provides the configuration state of each functional unit to the configuration function. When the hardware with errors is replaced, this function updates the state of the replaced and associated functional units.

The CEC IPL diagnostics function perform CEC hardware testing during system IPL (boot). If an error is found, it isolates the error to a predefined functional unit, then calls the deconfiguration function to inform it of the error type and functional unit with error. The platform IPL speed policy can be set to either fast or slow, the default is fast. If the speed is set to fast, the IPL diagnostics is bypassed during system IPL. If the speed is set to slow, the hardware testing is performed.

CEC Runtime Diagnostics Function: During system run time, CEC error is detected by the hardware error checker with "attention" (or interrupt) to the Service Processor. The PRD (Processor Runtime Diagnostics) is invoked to analyze the hardware error and isolate the error to the predefined functional unit. The PRD calls the Deconfiguration function to inform it of the error type and functional unit with error.

The innovative functions described above are extended to also support the persistent deconfiguration of multiple functional hardware units in the event of controller or interface/bus error between multiple functional units. The hardware functional unit with the highest probability of error is deconfigured with "error" reason. The related functional units that are affected by the faulty hardware are deconfigured with "association" reason. When the unit with the error is replaced (i.e., part serial number change is detected), the functional units that were deconfigured by "association" with that error will be configured.

In preferred embodiments, the Deconfiguration function also links to a system reboot function. When the CEC is terminated due to hardware fatal error, the error is isolated and related functional units are deconfigured. If the hardware with error is successfully deconfigured, the CEC is re-IPL with a faster speed because IPL diagnostics can be safely bypassed. In preferred embodiments, user policy can change this so that diagnostics are not bypassed.

In preferred embodiments, of the present invention, the service processor maintains a set of deconfiguration policies for the system. These policies can be changed by the user, preferably with Administrative Authority via ASM (Advanced System Management) user interface. The user policy options preferably include several choices. For example, preferred embodiments include the ability to deconfigure on predictive failure, deconfigure on functional failure.

Figure 3:
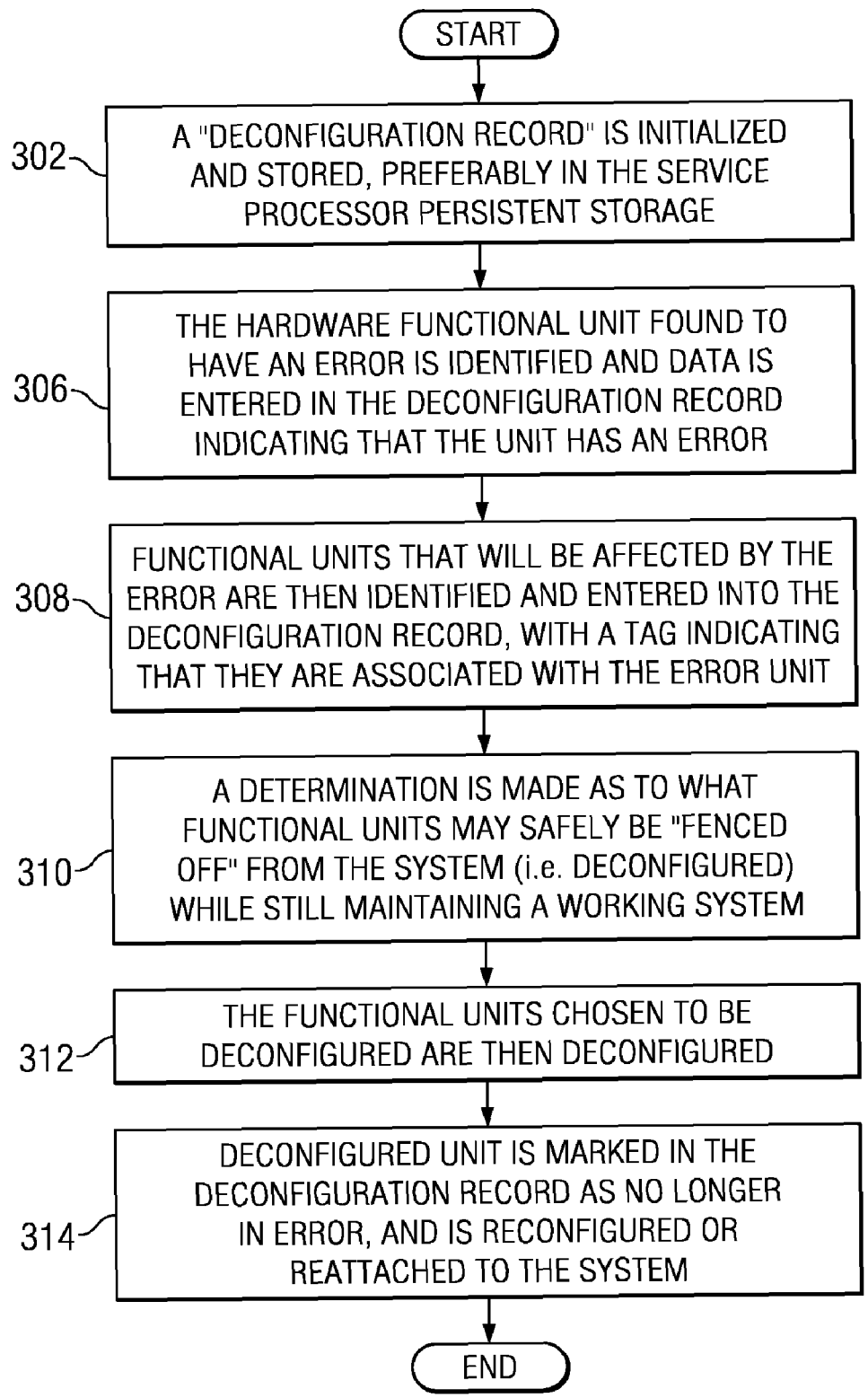
FIG. 3 shows a process flow for implementing a preferred embodiment of the present invention.
Figure 4:
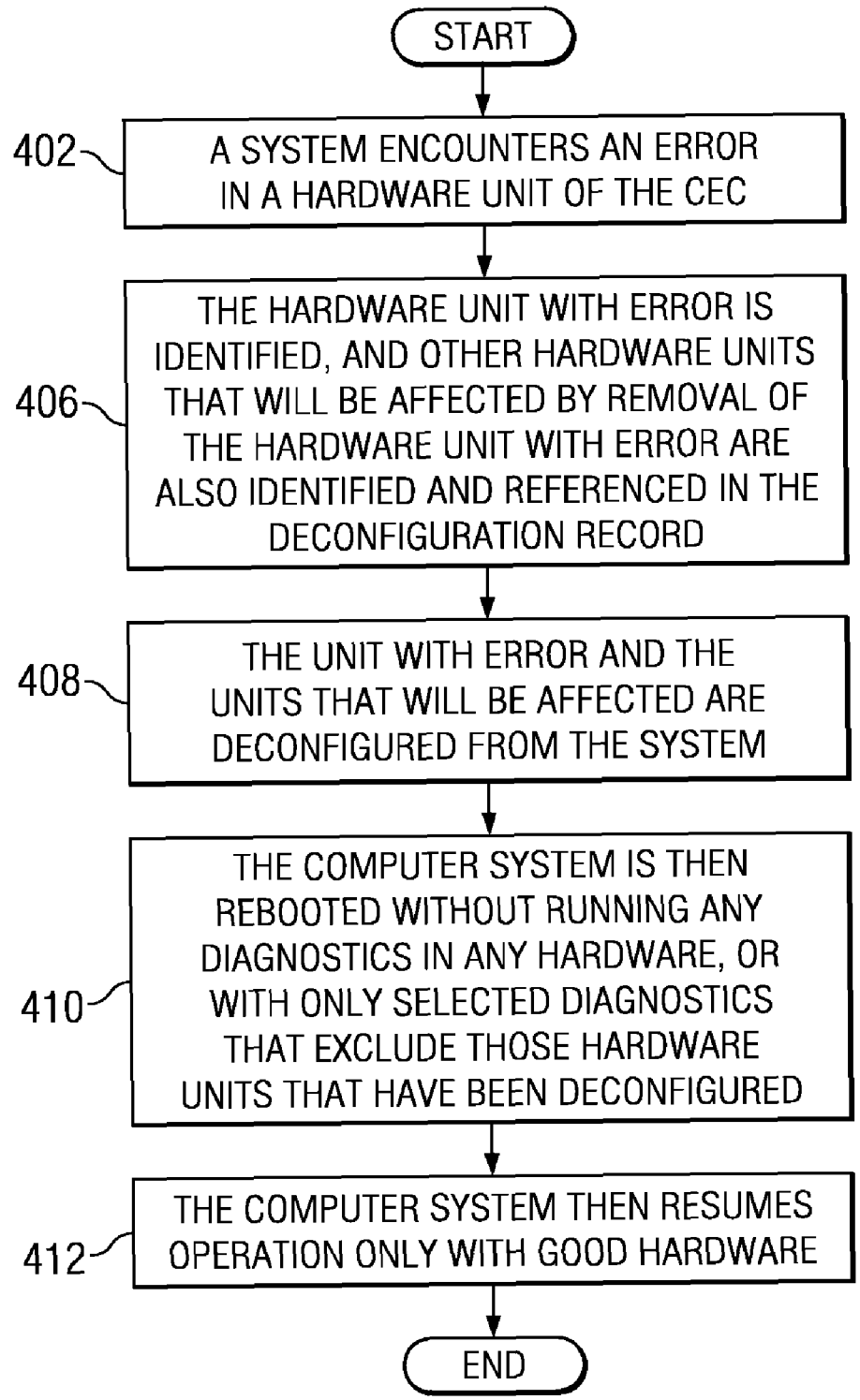
FIG. 4 shows a process flow for implementing a preferred embodiment of the present invention.

FIG. 3 shows a process flow for one aspect of a preferred embodiment of the present invention. At boot time, during the first CEC power on, a "Deconfiguration Record" is initialized and stored, preferably in the service processor persistent storage (step 302). This record preferably includes information about the hardware functional units or hardware resources within the CEC, such as configuration status (i.e., whether they are actively connected to the bus), error type encountered, an error code, hardware state data, and the user policy. The initial status assumes all functional units have no error and are configured. During the CEC IPL phase or during run time, if an error is detected in any hardware functional unit of the CEC, the hardware functional unit found to have an error is identified and data is entered in the Deconfiguration record indicating that the unit has an error (step 306). Functional units that will be affected by (or is connected to) the unit with error are then identified and entered into the Deconfiguration record, with a tag indicating that they are associated with the error unit (step 308). The information relating to which units are in error (and hence to be deconfigured as described below) allow the system to adjust. For example, the system can change its memory or hardware resource map accordingly. Next, a determination is made as to what functional units may safely be "fenced off" from the system (i.e., deconfigured) while still maintaining a working system (step 310). The functional units chosen to be deconfigured are then deconfigured during IPL of the system (step 312). Deconfiguration of the hardware is preferably accomplished using switches on the bus system that are controlled by system firmware. When a functional unit is designated for deconfiguration, the firmware activates switches that effectively remove the unit from the system, fencing it off so it is invisible to the system. When the functional unit with error is replaced or otherwise put in working order, that unit is marked in the Deconfiguration record as no longer in error, and is reconfigured or reattached to the system (step 314). The associated units that were deconfigured because of their association to the error unit are also reconfigured, i.e., reconnected to the system at this time.

Another process flow depicting another aspect of the present invention is described. This example implementation is a broader view of the invention, including other actions made possible because the functional units with error are removed from the system. First, the system encounters an error in a hardware unit of the CEC (step 402). The hardware unit with error is identified, and other hardware units that will be affected by removal of the hardware unit with error are also identified and referenced in the Deconfiguration record (step 406). The unit with error and the units that will be affected are deconfigured from the system (step 408). The computer system is then rebooted (without repairing the units with error) without running any diagnostics on any hardware, or with only selected diagnostics that exclude those hardware units that have been deconfigured (step 410). The computer system then resumes operation only with good hardware (step 412).

As described above, the present invention allows a computer system to encounter errors in hardware units, deconfigure those units, and restart without running extensive diagnostics as is typically practiced in the art.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media, such as a floppy disk, a hard disk drive, a RAM, CD-ROMS, DVD-ROMs, and transmission-type media, such as digital and analog communications links, wired or wireless communications links using transmission forms, such as, for example, radio frequency and light wave transmissions. The computer readable media may take the form of coded formats that are decoded for actual use in a particular data processing system.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A computer system, having at least one processor, memory, and a bus coupled between the memory and the processor, comprising:
   a plurality of hardware units connected to the computer system by the bus;
   a service processor having firmware;
   wherein when a first hardware unit of the plurality experiences an error, the first hardware unit is disconnected from the bus, wherein the error comprises a common bus interface error, and wherein a set of additional functional units associated with the common bus interface error are also disconnected from the bus; and
   wherein the computer system is restarted without running a first diagnostic associated with the first hardware unit and the set of functional units.

2. The computer system of claim 1, wherein the firmware of the service processor activates switches in circuitry of the computer system to disconnect the first hardware unit from the bus.

3. The computer system of claim 1, wherein a table is updated with information indicating the first hardware unit of the plurality has an error associated therewith.

4. The computer system of claim 1, further comprising:
responsive to the first hardware unit no longer having the error, resuming operation by the first hardware unit and other hardware associated with the first hardware unit.

5. The computer system of claim 1 wherein the computer system further has an I/O hub adapter that is persistently deconfigured.

6. A recordable type medium containing a computer program product for processing errors in a computer system having at least one processor, memory, and a bus coupled between the memory and the processor, and a first hardware unit connected to the computer system, wherein the computer program product comprises:
first instructions for detecting, by a service processor, when an error occurs associated with the first hardware unit of the computer system, wherein the error comprises a common bus interface error;
second instructions for disconnecting the first hardware unit from a bus of the computer system, wherein the second instructions further comprise instructions for disconnecting from the bus a set of additional functional units associated with the common bus interface error;
third instructions for indicating in a table entry in a second memory that the first hardware unit has an error associated therewith; and
fourth instructions for, when the computer system is rebooted, rebooting the computer system without running a first diagnostic associated with the first hardware unit and the set of additional functional units.

7. The recordable type medium of claim 6, wherein the second instructions further comprise firmware associated with a service processor of the computer system.

8. The recordable type medium of claim 6, wherein disconnecting the first hardware unit includes activating at least one switch of circuitry of the computer system such that the first hardware is excluded from the computer system.

9. The recordable type medium of claim 6, wherein the service processor identifies the first hardware unit in a table entry in a second memory indicating that the first hardware unit has an error, and wherein the set of additional functional units are identified in the table indicating that the set of additional functional units are associated with the failed hardware.

10. The recordable type medium of claim 6, further comprising:
responsive to the first hardware unit no longer having the error, resuming operation by the first hardware unit and other hardware associated with the first hardware unit.

11. The recordable type medium of claim 6 further comprising:
fifth instructions for persistently deconfiguring an I/O hub adapter.

\* \* \* \* \*